(12) United States Patent
Kaefer et al.

(10) Patent No.: US 7,975,185 B2
(45) Date of Patent: Jul. 5, 2011

(54) METHOD AND MANAGEMENT SYSTEM FOR CONFIGURING AN INFORMATION SYSTEM

(75) Inventors: Gerald Kaefer, Munich (DE); Reiner Schmid, Munich (DE)

(73) Assignee: Fujitsu Siemens Computers GmbH, Munich (DE)

( * ) Notice: Subject to any disclaimer, the term of this patent is extended or adjusted under 35 U.S.C. 154(b) by 469 days.

(21) Appl. No.: 12/107,642

(22) Filed: Apr. 22, 2008

(65) Prior Publication Data

US 2008/0195895 A1    Aug. 14, 2008

Related U.S. Application Data

(63) Continuation of application No. PCT/EP2007/050765, filed on Jan. 26, 2007.

(30) Foreign Application Priority Data

Mar. 23, 2006  (DE) .......................... 10 2006 013 514

(51) Int. Cl.
*G06F 11/00* (2006.01)
(52) U.S. Cl. ................ 714/47; 714/25; 714/40
(58) Field of Classification Search ............ 714/25, 714/40, 47
See application file for complete search history.

(56) References Cited

U.S. PATENT DOCUMENTS

| | | | | |
|---|---|---|---|---|
| 5,309,448 | A * | 5/1994 | Bouloutas et al. .......... | 714/25 |
| 5,500,940 | A * | 3/1996 | Skeie ............... | 714/25 |
| 5,864,660 | A * | 1/1999 | Hamameh et al. .......... | 714/32 |
| 6,219,805 | B1 * | 4/2001 | Jones et al. .............. | 714/38 |
| 6,324,659 | B1 * | 11/2001 | Pierro ............... | 714/48 |
| 6,550,017 | B1 | 4/2003 | Moiin et al. | |
| 6,684,349 | B2 * | 1/2004 | Gullo et al. .............. | 714/47 |
| 6,895,533 | B2 * | 5/2005 | Gray et al. .............. | 714/47 |
| 6,931,523 | B1 * | 8/2005 | Tomoson et al. ........... | 713/100 |
| 7,107,491 | B2 | 9/2006 | Graichen et al. | |
| 7,117,388 | B2 * | 10/2006 | Arimilli et al. ........... | 714/10 |
| 7,149,659 | B1 * | 12/2006 | Lesmerises .............. | 702/185 |
| 7,200,543 | B2 * | 4/2007 | Palladino ............... | 703/14 |
| 7,272,516 | B2 * | 9/2007 | Wang et al. .............. | 702/60 |
| 7,359,865 | B1 * | 4/2008 | Connor et al. ............ | 705/10 |
| 7,401,263 | B2 * | 7/2008 | Dubois et al. ............ | 714/47 |
| 7,613,625 | B2 * | 11/2009 | Heinrich ................ | 705/7 |
| 7,730,363 | B2 * | 6/2010 | Takezawa et al. .......... | 714/47 |

(Continued)

FOREIGN PATENT DOCUMENTS

EP    1117044 A1    7/2001

(Continued)

*Primary Examiner* — Robert Beausoliel
*Assistant Examiner* — Joshua P Lottich
(74) *Attorney, Agent, or Firm* — Slater & Matsil, L.L.P.

(57) ABSTRACT

According to the method for configuring an information system (1), components (2) are provided for the information system (1) and component-specific error susceptibility data (3) on the individual components (2). For a given system configuration (5), error susceptibility information (7) is determined for the information system (1) in this given system configuration (5) as a function of the component-specific error susceptibility data (3). The error susceptibility information (7) is evaluated with reference to given evaluation criteria (8). In a subsequent step, the information system (1) is configured in the given system configuration (5) if the error susceptibility information (7) satisfies the given evaluation criteria (8). By means of the method, it is achieved that only system configurations are accepted that satisfy requirements specified by the evaluation criteria (8) with respect to the reliability of the information system (1).

19 Claims, 4 Drawing Sheets

U.S. PATENT DOCUMENTS

| | | |
|---|---|---|
| 2002/0078403 A1 | 6/2002 | Gullo et al. |
| 2002/0091972 A1* | 7/2002 | Harris et al. .................... 714/47 |
| 2006/0026451 A1 | 2/2006 | Voigt |
| 2006/0075309 A1* | 4/2006 | Mayo et al. .................... 714/40 |
| 2008/0104453 A1* | 5/2008 | Mukherjee et al. ............. 714/47 |

FOREIGN PATENT DOCUMENTS

WO     WO 02/093380 A1    11/2002

\* cited by examiner

METHOD AND MANAGEMENT SYSTEM FOR CONFIGURING AN INFORMATION SYSTEM

This application is a continuation of co-pending International Application No. PCT/EP2007/050765, filed Jan. 26, 2007, which designated the United States and was not published in English, and which is based on German Application No. 10 2006 013 514.8 filed Mar. 23, 2006, both of which applications are incorporated herein by reference.

TECHNICAL FIELD

The invention relates to a method and a management system for configuring an information system, as well as to a computer program product suitable for executing the method.

BACKGROUND

For many applications, the reliability with which an information system makes available its services is of great importance. In the scope of the application, an information system is understood to be any system processing information; for example, end-user computer systems consisting of one or more computers, as well as computer systems providing services over a network (server arrangements), control systems (embedded systems), or systems in the field of pervasive computing. Information systems can involve static systems whose configuration is set essentially manually by a user or system administrator, or dynamic systems whose configuration can be changed dynamically and automatically. In server arrangements, such dynamic systems are known, for example, from the field of autonomous computing. In pervasive computing, components can often be detected automatically and linked ad hoc, wherein a dynamic configuration of the system is produced, particularly for mobile components.

To increase the reliability of information systems, various concepts are pursued. One possibility is to minimize or eliminate the negative effects of a resulting error. One method from this group, which is also designated as fault tolerant computing, is, for example, the redundant provision of replacement components, which take over as seamlessly as possible the function of a defective component.

Another concept relies on suitable components, which exhibit low susceptibility to errors, in the design. This solution approach is typically advanced for static systems during the design phase of the system in the scope of quality assurance. Here it is problematic that in the course of restructuring and expanding the system, it is not guaranteed that quality-assurance aspects are taken into account for also minimizing the susceptibility of the system to errors to a corresponding degree. In addition, this solution approach cannot be easily transferred to dynamically configured systems because they do not have a corresponding development phase in which a static configuration was set.

SUMMARY OF THE INVENTION

In one aspect, the present invention creates a method for configuring information systems, which also leads in dynamic systems to increased availability of the services of the information system. In another aspect, a management system for an information system and a computer program product are suitable for executing the method.

In one embodiment, the method for configuring an information system comprises the following steps. Components for the information system are provided, as well as component-specific error susceptibility data on the individual components. A system configuration for the information system is set, through which is specified which of the provided components are used. Error susceptibility information for the information system in the given system configuration is defined as a function of the component-specific error susceptibility data and this error susceptibility information is evaluated with respect to given evaluation criteria. In a subsequent step, the information system is configured in the given system configuration if the error susceptibility information fulfills the given evaluation criteria. Through the method, it is achieved that for a given system configuration, error susceptibility information for the entire information system is automatically determined with reference to the provided component-specific error susceptibility data of the individual components. By evaluating the error susceptibility information with reference to the given evaluation criteria, it is achieved that the information system is configured only with the given system configuration if the specified evaluation criteria are satisfied for the error susceptibility of the information system. In this way, it is guaranteed for each given system configuration that the information system fulfills the claims set for the system with respect to its reliability, which are defined by the given evaluation criteria.

In an advantageous refinement of the method, the component-specific error susceptibility data is provided by a central database. This offers the advantage of the ability to update the error susceptibility data at any time, for example, with reference to experience values.

In another advantageous implementation, the component-specific error susceptibility data is provided by the components themselves. The advantage of this implementation is that error susceptibility data specified by the manufacturer can be provided so that it is unmistakably associated with the component.

In another implementation of the method, at least parts of the component-specific error susceptibility data are stored in a central database and are provided so that they mirror the components. In this implementation of the method, the advantages of the two embodiments named above are combined.

In other advantageous implementations of the method, the component-specific error susceptibility data includes error likelihood and/or failure likelihood of the component. In an especially preferred way, here the error likelihood and/or the failure likelihood of the components are specified as a function of an operating period of the component. Furthermore, it is advantageous if component-specific error susceptibility data include statistics on prior failures of the component and/or information on expected downtimes for replacement of the component. It is further advantageous to specify the component-specific error susceptibility data completely or partially dependent on the use of the component. Here it is especially advantageous to provide use information by the information system and to determine the error susceptibility information for the information system as a function of the user information and the use-dependent, component-specific error susceptibility data. The error susceptibility data of the mentioned type advantageously allows the error susceptibility of the entire information system to be determined in a way that is adapted to the information system and optionally to the situation of use and that is thereby reliable.

The management system according to embodiments of the invention includes an estimating unit designed for determining error susceptibility information on the information system as a function of component-specific error susceptibility data and a given system configuration for the information system and an evaluation unit designed for evaluating the error susceptibility information with reference to given evaluation criteria. The management system is designed just like the computer program product to execute one of the previously specified methods according to various embodiments of the invention. The resulting advantages are analogous to those of the method.

In an especially preferred embodiment of the management system, the evaluation unit is designed to provide a system configuration to the estimating unit for determining error susceptibility information. This embodiment advantageously provides for automatically locating a suitable or the most suitable system configuration as a function of the components provided for use in the information system.

BRIEF DESCRIPTION OF THE DRAWINGS

The invention is explained in more detail below with reference to embodiments shown in the four figures, wherein.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
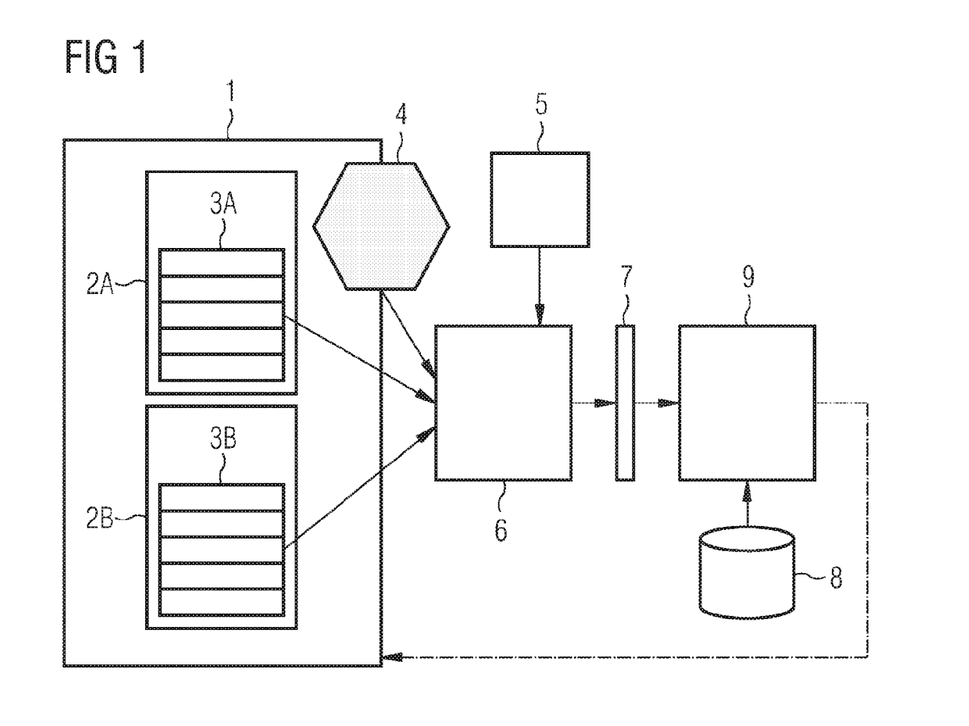
FIG. 1 provides a schematic representation of a first embodiment of a management system according to the invention together with an information system.

FIG. 1 shows an information system 1 comprising components 2A and 2B, which each feature error susceptibility data 3A and 3B. The information system 1 further includes use information 4. The error susceptibility data 3A and 3B and the use information 4 are provided together with a given system configuration 5 to an estimating unit 6. The estimating unit 6 outputs error susceptibility information 7, which is provided together with evaluation criteria 8 to an evaluation unit 9. The evaluation unit 9 is in turn connected to the information system 1 for configuring the information system 1.

Elements that are identical or that have identical actions are provided with the same reference symbols in the figures. Reference symbols provided with an index (A, B, C) refer to a specific component 2 or set of error susceptibility data 3. If a reference symbol without an index is used, it refers to the corresponding feature in general.

The information system shown in FIG. 1 can involve an individual computer or also a computer system made from several individual computers. The information system 1 can have a plurality of components, of which a few are mandatory and others optional. Here, for example, only two components 2 are shown, each with the error susceptibility data 3.

The error susceptibility data 3 is information on the reliability of the component 2 that is stored inside the components 2. The error susceptibility data 3 does not directly contribute to the operation of the component 2, but is understood instead as meta-data describing the component 2. The error susceptibility data 3 can include, for example, information concerning error and failure likelihood of the component 2 or information concerning expected downtimes for replacing the component 2. Furthermore, error tolerance information can also be provided, which indicates how tolerant or immune the components 2 are with respect to errors of other components. The information can be obtained and given with reference to estimates by the manufacturer and supplemented or replaced by statistical or empirical observations of the user or user groups.

The information can be specified either as constants or as a function of other parameters. Such parameters can relate to the use of the component, for example, the information on error and failure likelihood of a component can be performed as a function of a total use period, a daily use period, or an operating mode. One example of dependency of the error susceptibility on the operating mode is a hard disk drive, which can be used with or without a volatile buffer (cache) for write operations. If a cache is used, the hard disk drive is burdened with fewer write accesses and is consequently less susceptible to errors than if it is operated without a cache. Conversely, the error tolerance of the hard disk drive changes, e.g., relative to an error of a power supply unit, because if it fails, data still buffered in the cache of the hard disk drive is lost when the hard disk drive is operated in cache mode. Furthermore, it is conceivable to specify the error susceptibility data 3 as a function of ambient parameters, e.g., ambient temperature.

The components 2 can be software components, for example, user or operating-system programs or updates of programs (updates, patches), or can be hardware components, for example, expansion cards or peripherals. For providing error susceptibility data 3 by the components 2, different methods can be used. For software components, an API (Application Programming Interface) is provided. For hardware components, as an interface for meta-data, for example, the plug-and-play interface is known, which can also be used in an expanded form for transmitting error susceptibility data 3. Here, the error susceptibility data 3 can be stored and transmitted in any arbitrary data format, but, on the basis of expandability and platform independence, encapsulation in a descriptive language, such as XML (eXtensible Markup Language) is advantageous.

A management system according to embodiments of the invention can be formed essentially by the estimating unit 6 and the evaluation unit 9. Advantageously, the management system is constructed independently of the information system as a standalone unit, but it is also possible to provide the management system as one unit in the information system 1. Depending on the design, different interfaces can be used for data exchange (reading error susceptibility data 3 and use information 4, output of configuration instructions) with the information system 1. In particular, for management systems with standalone hardware independent of the information system 1, known network transmission paths are offered.

Figure 2:
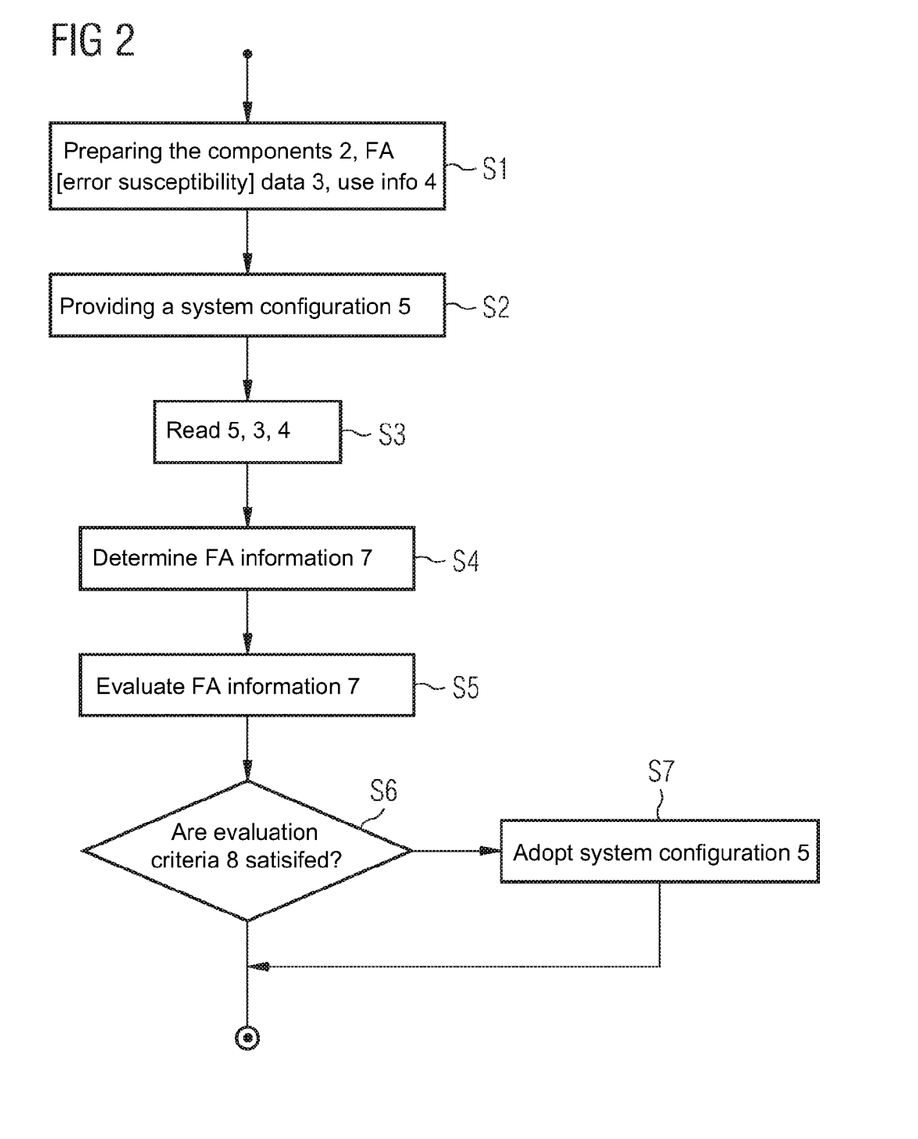
FIG. 2 provides a flow chart of one embodiment of a method according to the invention.

In the following, in connection with the flow chart in FIG. 2, an embodiment of the example method according to the invention is shown in more detail as can be implemented by the arrangement shown in FIG. 1.

In a first step S1, the components 2 for the information system 1 are provided together with their error susceptibility data 3. This can be realized, as already described in connection with FIG. 1, in such a way that each component 2 contains stored error susceptibility data 3 relevant to it. In one alternative embodiment, it is conceivable that the error susceptibility data 3 is not stored in the components 2 themselves, but instead in a database. In another embodiment, a combination system is conceivable in such a way that error susceptibility data 3 can be stored in the components 2, but can be expanded or updated, if necessary, by error susceptibility data 3 from a database. To allow uniform access to error susceptibility data 3 in such a system, it is conceivable that the error susceptibility data 3 stored in the database can be retrieved from the database by the components 2 and provided to the component in the same way as the error susceptibility data 3 (mirrored error susceptibility data 3) stored within the components. Furthermore, in step S1, the use information 4 is provided by the information system 1.

In a step S2, a system configuration 5 for the information system 1 is given. The system configuration 5 here includes at least information on which of the provided components 2 in the information system 1 are used or are supposed to be used. In addition, information can be provided on how the components 2 being used interact with each other. However, it is also possible that this is implicit from the type of selected components.

A specification of the system configuration 5 can be realized in various ways. First, a specification on an operating system-specific way is possible, e.g., according to WS management (Web Services for Management) by Microsoft. Second, the use of an operating system-independent standard is conceivable, for example, CIM (Computer Interface Model) of the DMTF (Distributed Management Task Force) organization or WSDM (Web Services Distributed Management) of OASIS (Organization for the Advancement of Structured Information Standards).

In a step S3, both the system configuration 5 and also the error susceptibility data 3 of the components 2 used according to the system configuration 5 and the use information 4 are read by the estimating unit 6.

Taking into consideration the system configuration 5 and the use information 4, the estimating unit 6 determines, in this respect, the error estimate information 7 for the entire information system 1 with reference to the error estimate data 3 in a step S4. Methods and algorithms used for this purpose are known from the theory of error propagation and error estimation. As an example, the Markov chain theory should be mentioned, which has been established as particularly suitable for describing error estimation within information systems.

The error susceptibility information 7 generated by the estimating unit 6 includes data similar to the error susceptibility data 3, but not related to an individual component 2 but to the entire information system 1. With the error susceptibility information 7, uncertainty levels can also be specified, which indicate the level of certainty with which the error susceptibility information 7 was derived from the corresponding error susceptibility data 3.

The error susceptibility information 7 transmitted by the estimating unit 6 to the evaluation unit 9 is evaluated in a next step S5 with reference to evaluation criteria 8. This evaluation criteria 8 can be made available to the evaluation unit 9, for example, by a database, e.g., the so-called policy database. The evaluation criteria 8 define the requirements placed on an information system with respect to reliability. In the simplest case, it can involve, e.g., a threshold value for barely justifiable error likelihood of the information system. In general, the evaluation criteria 8 has multiple levels and takes into account the complexity of the transmitted error susceptibility information 7. An evaluation can be performed, for example, on different time scales, e.g., by specifying evaluation criteria 8 as a function of a use period. Furthermore, downtimes to be expected for certain errors are to be taken into account. Here, it is possible to let available means for correcting a possible error influence the evaluation, e.g., the question whether an error can be corrected by internal, always available service means or whether external service means, which under some circumstances, may not be immediately available, must be used.

In a step S6, it is decided whether the given system configuration 5 fulfills the requirements on reliability placed on it and represented in the evaluation criteria 8. Only when these requirements are satisfied is the information system 1 configured with the system configuration 5 in a step S7. If the imposed requirements are not fulfilled, then the method ends after step S6; otherwise, it ends after step S7 after a successful configuration.

The method can be constructed so that the steps S1 to S7 are executed once on demand. In alternative embodiments, the provided components 2 and/or the error estimation data 3 (especially when this is provided not by the components 2 themselves, but instead via a database) and/or the given system configuration 5 can be tested continuously for changes and the steps S3 to S6 can be executed only when such changes are observed. In another embodiment, it is conceivable to provide a new system configuration with reference to the evaluation results of a given system configuration 5 if it is determined in step S6 that the given system configuration 5 does not satisfy the requirements placed on the reliability of the information system. With the new system configuration as a given system configuration 5, S3 to S6 are executed again. The method can be executed iteratively until a suitable configuration is found that is then accepted in step S7. A management system designed for executing such a method is explained in more detail below with reference to FIG. 3.

Figure 3:
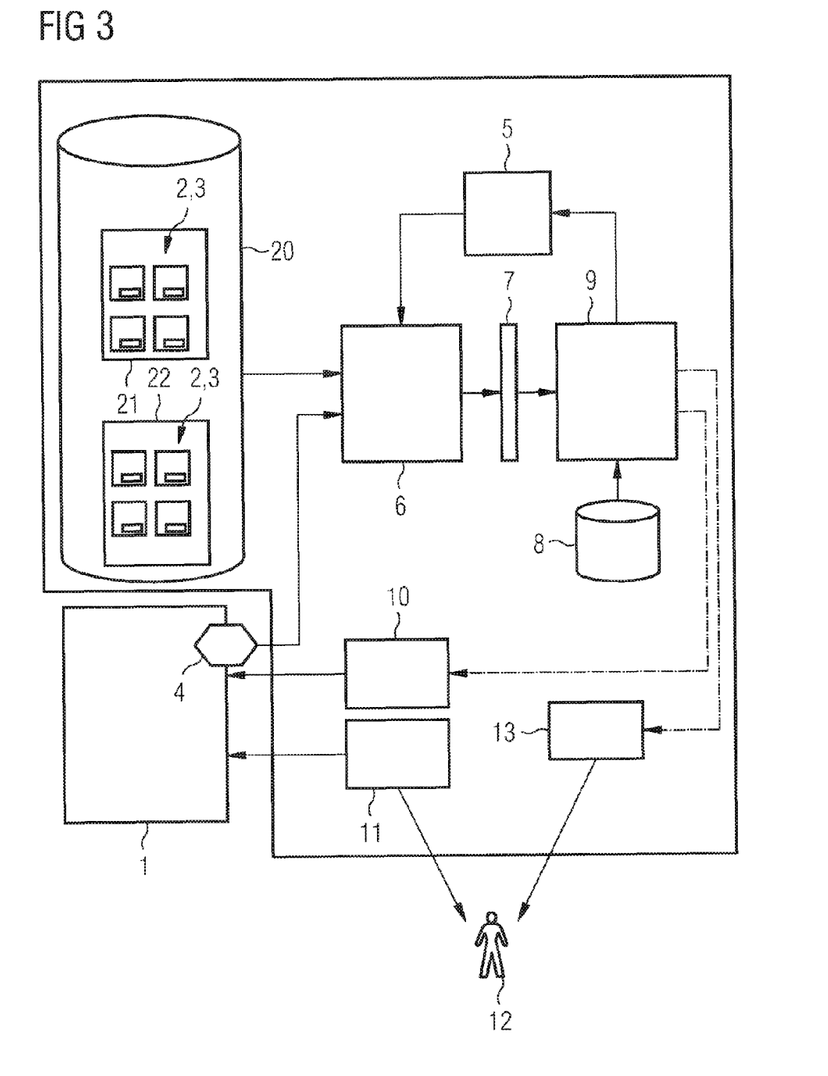
FIG. 3 provides a second embodiment of a management system according to the invention together with an information system.

FIG. 3 shows another embodiment of a management system according to the invention for configuring an information system. The system shown in FIG. 3 differs from that shown in FIG. 1 primarily in that a component database 20 is provided in which the error susceptibility data 3 of the components 2 are stored. The components 2 are here assigned either to a first group 21 of required components 2 or to a second group 22 of optional components 2. Another difference is that the evaluation unit 9 is not to be configured directly with the information system 1, but either via a unit for automatic configuration 10 or via a unit for manual configuration 11, where this unit is controlled by an operator 12. A proposed system configuration 13 is submitted to the operator 12 for this purpose by the evaluation unit 9.

The arrangement shown in FIG. 3 is especially suitable when the information system 1 involves a larger computer system. The components 2 stored in the component database 20 are understandably, in this case, software components, that is, applications, updates, patches. In addition, however, error susceptibility data 3 on hardware components can be stored either in the component database 20 or in another database not shown here.

In this embodiment, the evaluation unit 9 is designed to give the system configuration 5. For this purpose, a number of possible system configurations, for example, can be given, from which one system configuration 5 is selected as a function of the available components 2 in the component database 20. As already mentioned in connection with FIGS. 1 and 2, for this given system configuration 5, the error susceptibility information 7 is then generated with reference to the component-specific error susceptibility data 3 of components 2 in use as well as the use information 4 by the evaluation unit 6. This is transmitted, as before, to the evaluation unit 9 and evaluated by the evaluation unit 9 with reference to the evaluation criteria 8. If the given system configuration 5 does not satisfy the set requirements, another system configuration 5 can be selected by the evaluation unit 9 from the specified system configurations and the method can be executed again. In this way, a suitable system configuration fulfilling the set requirements or the system configuration best fulfilling the set requirements or at least the system configuration coming closest to the set requirements is found iteratively. If this system configuration thoroughly fulfills the requirements, the evaluation unit 9 instructs the unit for automatic configuration 10 to change the system configuration in the information system 1.

Under certain circumstances, which are likewise fixed by the evaluation criteria 8, a found system configuration is not forwarded to the unit for automatic configuration 10, but is first presented as a proposed system configuration 13 to the operator 12. Such a case is then conceivable, e.g., when the proposed system configuration 13 just barely does or does not satisfy the set conditions or when changes to the hardware components of the information system 1 are necessary for converting the new system configuration or when the error susceptibility information forming the basis of the proposed system configuration is associated with a high level of uncertainty.

Figure 4:
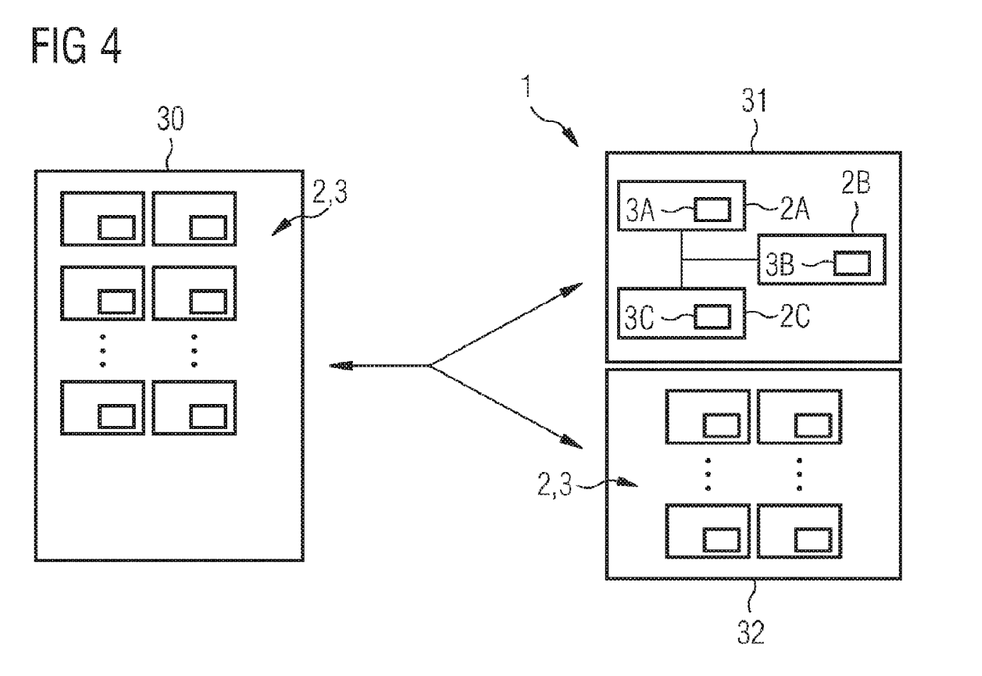
FIG. 4 provides an information system that can be automatically configured ad hoc and that is suitable for executing the method according to the invention.

FIG. 4 shows the use of the method according to the invention in a dynamic information system 1 with an ad hoc automatic configuration. Such systems are found increasingly, e.g., in home and/or building automation (e.g., pervasive computing). Such a system can here include a plurality of very different components or functional units, which can be both stationary and also mobile devices. These devices make use of various, so-called discovery technologies, in order to be able to find each other together for setting up an information system 1. Examples of such technologies are UPnP (Universal Plug and Play) or Bluetooth.

In FIG. 4, a first group 30 of components 2, which have found each other by means of the mentioned discovery technologies, is shown on the left side. According to the invention, the individual components 2 are equipped, in turn, with error susceptibility data 3. Through automatic organization mechanisms known from the field of pervasive computing, components 2 found from the first group 30 form a second group 31 of components 2A-C in use, as well as a third group 32 of redundant components 2.

So that the information system 1 provides its services with the desired reliability, the automatic organization mechanisms forming the basis of the dynamic configuration of the information system 1 are constructed according to the invention in such a way that the error susceptibility information 3A-C, which is provided by the individual components 2A-C, is used during the configuration process for determining error susceptibility information, which can be included in the configuration process after corresponding evaluation. In a similar way to how the automatic organization process is a distributed process in ad hoc automatically configuring systems, the compilation of the error susceptibility data 3A-C, the estimation of error susceptibility information of a possible system configuration, and their evaluation is also executed as a distributed process.

What is claimed is:

1. A method for changing a configuration of a dynamic information system, the method comprising:
    providing components for the dynamic information system;
    providing component-specific error susceptibility data on the individual components, wherein the error susceptibility data indicates how tolerant or immune the components are with respect to errors of other components;
    providing a given system configuration for the dynamic information system, the system configuration determining the components supposed to be used;
    determining error susceptibility information for the dynamic information system in the given system configuration as a function of the component-specific error susceptibility data;
    evaluating the error susceptibility information with reference to given evaluation criteria; and
    automatically configuring the dynamic information system in the given system configuration if the error susceptibility information satisfies the given evaluation criteria.

2. The method according to claim 1, wherein the component-specific error susceptibility data is provided by a central database.

3. The method according to claim 1, wherein the component-specific error susceptibility data is provided by the components themselves.

4. The method according to claim 1, wherein the component-specific error susceptibility data includes error likelihood and/or failure likelihood of the components.

5. The method according to claim 4, wherein the error likelihood and/or the failure likelihood of the components is specified as a function of an operating period of the components.

6. The method according to claim 1, wherein the component-specific error susceptibility data includes statistics on previous failures of the components.

7. The method according to claim 6, wherein the component-specific error susceptibility data further includes information on expected downtimes for replacing the components.

8. The method according to claim 1, wherein the component-specific error susceptibility data includes information on expected downtimes for replacing the components.

9. The method according to claim 1, wherein the component-specific error susceptibility data is specified completely or partially as a function of the use of the components.

10. The method according to claim 9, wherein use information is provided by the dynamic information system and wherein the error susceptibility information for the dynamic information system is determined as a function of the use information and use-dependent, component-specific error susceptibility data.

11. The method according to claim 1, wherein at least one of the provided components, the error estimation data and the given system configuration is tested continuously for changes and the steps of providing components, component-specific error susceptibilities and the given system configuration, and also the steps of determining and evaluating are performed only when such a change is observed.

12. The method according to claim 1, wherein a new system configuration is provided with reference to the evaluation results of the given system configuration, if in the step of evaluating it is determined that the given system configuration does not satisfy the requirements placed on the reliability of the information system and the steps of providing of determining and evaluating are performed again with based on the new system configuration.

13. The method according to claim 12, wherein the steps of providing, determining and evaluating a new system configuration are performed iteratively until a suitable new system configuration is found in the step of evaluating and used in the step of configuring.

14. A method for configuring an information system, the method comprising:
- providing components for the information system;
- providing component-specific error susceptibility data on the individual components;
- providing a given system configuration for the information system, the system configuration determining the components to be used;
- determining error susceptibility information for the information system in the given system configuration as a function of the component-specific error susceptibility data;
- evaluating the error susceptibility information with reference to given evaluation criteria; and
- configuring the information system in the given system configuration if the error susceptibility information satisfies the given evaluation criteria;
- wherein the component-specific error susceptibility data is provided by the components themselves; and
- wherein the component-specific error susceptibility data is stored in a central database and is provided mirrored by the components.

15. A management system for changing a configuration of a dynamic information system, the management system comprising:
- an estimation unit designed for determining error susceptibility information for the dynamic information system as a function of component-specific error susceptibility data and a given system configuration for the dynamic information system, wherein the error susceptibility data indicates how tolerant or immune the components are with respect to errors of other components and the given system configuration determines the components supposed to be used;
- an evaluation unit designed for evaluating the error susceptibility information with reference to given evaluation criteria; and
- a unit for automatic configuration adapted for configuring the dynamic information system in the given system configuration if the error susceptibility information satisfies the given evaluation criteria;
- wherein the management system comprises a standalone hardware unit or a unit of an information system that comprises at least one hardware component.

16. The management system according to claim 15, wherein the evaluation unit is designed to provide the system configuration to the estimation unit for determining error susceptibility information.

17. The management system according to claim 15, further comprising a central database for storing component-specific error susceptibility data.

18. The management system according to claim 16, wherein the evaluation unit is configured to select a system configuration from a number of specified system configurations and to provide it to the estimation unit for determining error susceptibility information for the dynamic information system for the provided system configuration; and, if the first system configuration does not satisfy the set requirements, to iterative select another system configuration from the number of specified system configurations and to provide it to the estimation unit for determining error susceptibility information in order to find a suitable system configuration fulfilling the set requirements or the system configuration best fulfilling the set requirements or at least the system configuration coming closest to the set requirements; and to instruct the unit for automatic configuration to change the system configuration in the dynamic information system to the found system configuration.

19. The management system according to claim 18, further comprising:
- a component database storing the components and error susceptibility data of the components, wherein the components are software components.

* * * * *